United States Patent
Loy et al.

(10) Patent No.: US 7,072,894 B2
(45) Date of Patent: Jul. 4, 2006

(54) DATA MANAGEMENT APPLICATION PROGRAMMING INTERFACE HANDLING MOUNT ON MULTIPLE NODES IN A PARALLEL FILE SYSTEM

(75) Inventors: Irit Loy, Haifa (IL); John Marberg, Haifa (IL); Boaz Shumeli, Pittsburgh, PA (US); Zvi Yehudai, Haifa (IL); Robert Curran, West Hurley, NY (US); Roger Haskin, Morgan Hill, CA (US); Frank Schmuck, Campbell, CA (US); James Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 09/887,576

(22) Filed: Jun. 25, 2001

(65) Prior Publication Data

US 2002/0144047 A1    Oct. 3, 2002

Related U.S. Application Data

(60) Provisional application No. 60/214,127, filed on Jun. 26, 2000.

(51) Int. Cl.
  G06F 17/30    (2006.01)
  G06F 15/16    (2006.01)
  G06F 11/00    (2006.01)
(52) U.S. Cl. .................. 707/10; 709/216; 709/202; 714/11
(58) Field of Classification Search .................. 707/10; 709/105, 202, 216; 714/11
See application file for complete search history.

(56) References Cited

U.S. PATENT DOCUMENTS

| | | | |
|---|---|---|---|
| 5,023,873 A | 6/1991 | Stevenson et al. | 709/232 |
| 5,517,622 A | 5/1996 | Ivanoff et al. | 714/4 |
| 5,561,759 A | 10/1996 | Chen | |
| 5,592,664 A | 1/1997 | Starkey | 711/100 |
| 5,644,766 A | 7/1997 | Coy et al. | |
| 5,649,092 A | 7/1997 | Price et al. | |
| 5,893,086 A | 4/1999 | Schmuck et al. | |
| 5,897,638 A | 4/1999 | Lasser et al. | |
| 5,909,450 A | 6/1999 | Wright | |
| 5,926,619 A | 7/1999 | Badovinatz et al. | |

(Continued)

OTHER PUBLICATIONS

Sun Cluster 2.2 Software Installation Guide, Sun Microsystems, Inc. Part No. 806-1008, Apr. 1, 1999.*

(Continued)

*Primary Examiner*—Greta Robinson
*Assistant Examiner*—Kuen S. Lu
(74) *Attorney, Agent, or Firm*—Browdy and Neimarkm PLLC

(57) ABSTRACT

In a cluster of computing nodes having shared access to one or more file systems in data storage using parallel file system software, a method for managing the data storage includes initiating a session of a data management application on a first one of the nodes, while running a user application on a second one of the nodes. A request is submitted to the parallel file system software by the user application on the second node to mount one of the file systems in the data storage. A mount event message is sent from the second node to the first node responsive to the request, for processing by the data management application on the first node. When the file system is to be unmounted, preunmount and unmount events are sent for processing by the data management application on the first node.

63 Claims, 6 Drawing Sheets

U.S. PATENT DOCUMENTS

| | | | |
|---|---|---|---|
| 5,940,838 A | 8/1999 | Schmuck et al. | |
| 5,946,685 A * | 8/1999 | Cramer et al. | 707/10 |
| 5,946,686 A | 8/1999 | Schmuck et al. | |
| 5,963,963 A | 10/1999 | Schmuck et al. | |
| 5,987,477 A | 11/1999 | Schmuck et al. | |
| 5,999,976 A | 12/1999 | Schmuck et al. | |
| 6,021,508 A | 2/2000 | Schmuck et al. | |
| 6,023,706 A | 2/2000 | Schmuck et al. | |
| 6,023,710 A | 2/2000 | Steiner et al. | |
| 6,032,216 A | 2/2000 | Schmuck et al. | |
| 6,065,065 A | 5/2000 | Murakami et al. | |
| 6,076,108 A | 6/2000 | Courts et al. | 709/219 |
| 6,151,684 A * | 11/2000 | Alexander et al. | 714/4 |
| 6,192,408 B1 * | 2/2001 | Vahalia et al. | 709/229 |
| 6,202,080 B1 * | 3/2001 | Lu et al. | 718/105 |
| 6,249,879 B1 * | 6/2001 | Walker et al. | 714/11 |
| 6,275,953 B1 * | 8/2001 | Vahalia et al. | 714/11 |
| 6,289,464 B1 | 9/2001 | Wecker et al. | |
| 6,360,331 B1 | 3/2002 | Vert et al. | |
| 6,363,411 B1 * | 3/2002 | Dugan et al. | 709/202 |
| 6,519,643 B1 | 2/2003 | Foulkes et al. | 709/227 |
| 6,535,923 B1 | 3/2003 | Giroir | 709/241 |
| 6,601,101 B1 | 7/2003 | Lee et al. | |
| 6,625,601 B1 | 9/2003 | Molly | |
| 6,625,639 B1 * | 9/2003 | Miller et al. | 718/106 |
| 6,718,372 B1 * | 4/2004 | Bober | 709/217 |
| 2002/0026605 A1 | 2/2002 | Terry | |
| 2002/0056003 A1 | 5/2002 | Goswami | |
| 2003/0097517 A1 | 5/2003 | Haneda | |
| 2003/0128687 A1 | 7/2003 | Worlfolk et al. | |

OTHER PUBLICATIONS

Using the Parallel Virtual File System, Ross et al., Clemson University, Jan., 2001.*

NFS File Sets, Connectathon '97, Eisler et al., 1997, SunSoft.*

Sun Cluster 3.0 Data Services Developers' Guide, Nov., 2000, Sun Microsystems, Inc.*

Sun HPC ClusterTools 3.1, Administrator's Guide, Sun Microsystem, Mar. 2000.*

A. Miroshnichenko, "Data Management API: The Standard and Implementation Experiences", Veritas Software Corp., Mountain View, California, 1996, 12 pages.

"DMEpi: Data Management API for DFS/Episode", Transarc Corp., Pittsburgh, PA, Dec. 1996, 16 pages.

R. Agarwalla et al., "HPSS/DFS: Integration of a Distributed File System with a Mass Storage System", NASA Goddard Conference on Mass Storage Systems and Technologies, IEEE Symposium on Mass Storage Systems, Mar. 23-26, 1998, 15 pages.

"HPSS Release 4.1 New Features", 2000, 5 pages. (http://www.sdsc.edu/hpss/ReleaseInfo/release_4.1.html).

P. Lawthers, "The Data Management Applications Programming Interface", published in the *Proceedings of the Fourteenth IEEE Symposium on Mass Storage Systems, Second Int'l Symposium, entitled "Storage—At the Forefront of Information Infrastructures"*, Monterey, California, Sep. 11-14, 1995, pp. 327-335.

Tivoli® Storage Manager (Web Page), "Tivoli Storage Manager—IBM AIX Client", Jun. 23, 2000, one page.

"NetWorker HSM—Advanced Data Management", Legato® Systems, Inc., 2000, three pages. (wysiwyg://96/http://portal1.legato.com/products/protection/networker/hsm/).

"What is DMF?", SGI—Software: Data Migration Facility Overview, Silicon Graphics, Inc., 2000, 6 pages. (http://www.sgi.com/software/dmf/overview.html).

"CrosStor DMAPI-Compatible Event Management", CrosStor Software, Inc., XI, 1999, 6 pages. (wysiwyg://111/http://www.crosstor.com/technology/DMAPI.html).

"DFS Storage Management Runtime (SMR)", DFS Administration Guide, IBM Corp., 2000, 5 pages. (http://www.transarc.com/Library/documentation/dfs/3.1/AdminGd/duagd017.htm).

ADIC Inc., Software Products Web Page, 2000, 4 pages. (http://www.adic.com/US English/Products/Software/fileServ/).

"An Introduction to GPFS 1.2", IBM Corp., Dec. 1998, 15 pages.

"GPFS Parallel File System", Almaden Computer Science Research, IBM Corp., 2000, one page. (http://www.almaden.ibm.com/cs/gpfs.html).

Product entitled "Veritas Storage Migrator for UNIX", Veritas Software Corp., Mountain View, California, 2000, one page (http://www.veritas.com/us/products/storagemigratorunix/prodinfo.html).

"Tivoli® Space Manger for UNIX Using the Hierarchical Storage Management Clients", Version 3, Release 7, IBM Corp., Apr. 2000, 230 pages.

"IBM General Parallel File System for AIX: Data Management API Guide", IBM Corp., Jul. 2000, 56 pages.

"IBM General Parallel File System for AIX: Concepts, Planning, and Installation Guide", IBM Corp., Dec. 2000, 2$^{nd}$ Edition, 106 pages.

"X/Open CAE Specification: Systems Management: Data Storage Manangement (XDSM) API Sanity-Check Draft", X/Open Co. Ltd., United Kingdom, Jul. 1996, 178 pages.

"High Availability Cluster Multiprocessing for AIX Version 4.3", IBM Corp., 2000, 5 pages. (wysiwyg://17/http://www.rs6000.ibm.com/software/Apps/hacmp/).

R.L. Haskin, "Tiger Shark—A Scalable File System for Multimedia", *IBM Journal of Research & Development*, vol. 42, No. 2—Multimedia Systems, IBM Corp., 1998, 16 pages. (http://www.research.ibm.com/journal/rd/422/haskin.html).

"UniTree Announces High Performance XDSM (DMAPI) File System Product", UniTree Software, Inc., May 17, 1999, one page.

"CAE Specification: Data Storage Management—A Systems Approach", The Open Group, Feb. 1997, table of contents (3 pages). (www.opengroup.org).

R. Gooch, "Overview of the Virtual File System", Jul. 5, 1999, 8 pages. (http://www.atnf.csiro.au/~rgooch/linux.vfs.txt).

NOVELL: Netware 5.1:Detailed View, 2000, 8 pages. (http://www.novell.com/products/netware/details.html).

"Sun's Network File System (NFS)", 2001, 5 pages. (http://www.cs.tamu.edu/faculty/bettati/Courses/662/Spring-2001/Slides/HTTP/DFS/sl).

"Microsoft Distributed File System" [Microsoft Windows NT Server 4.0; Distributed Fi . . . ], last updated Sep. 15, 2000, 9 pages. (http://www.microsoft.com/NTServer/nts/downloads/winfeatures/NTSDistrFile/Admin . . . ).

Terry Jones, Alice Koniges, R. Kim Yates, Performance of the IBM General Parallel Filing System, 2000, IEEE.

* cited by examiner

DATA MANAGEMENT APPLICATION PROGRAMMING INTERFACE HANDLING MOUNT ON MULTIPLE NODES IN A PARALLEL FILE SYSTEM

CROSS-REFERENCE TO RELATED APPLICATIONS

This application claims the benefit of U.S. Provisional Patent Application No. 60/214,127, filed Jun. 26, 2000. It is related to four other U.S. patent applications, filed on even date, entitled "Data Management Application Programming Interface Session Management for a Parallel File System"; "Implementing Data Management Application Program Interface Access Rights in a Parallel File System"; "Data Management Application Programming Interface for a Parallel File System"; and "Data Management Application Programming Interface Failure Recovery in a Parallel File System." All of these related applications are assigned to the assignee of the present patent application and are incorporated herein by reference.

FIELD OF THE INVENTION

The present invention relates generally to computer file systems, and specifically to implementation of data management applications in parallel file systems.

BACKGROUND OF THE INVENTION

A wide variety of data management (DM) applications have been developed to supplement the basic file storage and retrieval functions offered by most operating system (OS) kernels. Typical DM applications include hierarchical storage management (also known as data migration), unattended data backup and recovery, on-line encryption and compression, and directory browsers. These applications, which extend the basic OS kernel functions, are characterized by the need for monitoring and controlling the use of files in ways that ordinary user applications do not require.

In response to this need, the Data Management Interfaces Group (DMIG) was formed by a consortium of UNIX® software vendors to develop a standard Data Management Application Programming Interface (DMAPI). DMAPI provides a consistent, platform-independent interface for DM applications, allowing DM applications to be developed in much the same way as ordinary user applications. By defining a set of standard interface functions to be offered by different OS vendors, DMAPI gives DM software developers the tools they need for monitoring and controlling file use, without requiring them to modify the OS kernel. DMAPI is described in detail in a specification document published by the Open Group (www.opengroup.org), entitled "Systems Management: Data Storage Management (XDSM) API" (Open Group Technical Standard, 1997), which is incorporated herein by reference. This document is available at www.opengroup.org.

As noted in the XDSM specification, one of the basic foundations of DMAPI is "events." In the event paradigm, the OS informs a DM application running in user space whenever a particular, specified event occurs, such as a user application request to read a certain area of a file. The event may be defined (using DMAPI) as "synchronous," in which case the OS will notify the DM application of the event and will wait for its response before proceeding, or as "asynchronous," in which case OS processing continues after notifying the DM application of the event. The area of a file with respect to which certain events are defined is known as a "managed region."

Another fundamental concept in DMAPI is a "token," which is a reference to a state that is associated with a synchronous event message. The state typically includes lists of files affected by the event and DM access rights in force for those files. The token may be passed from thread to thread of the DM application and provides a convenient means for referencing the state. Access rights may either be shared with other processes (in which case they are read-only rights), or they may be exclusive (read-write) rights.

Communications between DM applications and the OS are session-based. The DM application creates the session by an appropriate DMAPI function call (dm_create_session( )). The application then registers event dispositions for the session, indicating which event types in a specified file system should be delivered to the session. Multiple sessions may exist simultaneously, and events in a given file system may be delivered to any of these sessions.

The DMAPI standard, having grown out of the needs of UNIX system vendors, is based on the notion of a single system environment, using a single computing node. DMAPI implementations have also been developed for distributed file systems, which allow a user on a client computer connected to a network to access and modify data stored in files on a file server. When a user accesses data on the file server, a copy of the data is stored, or cached, on the client computer, and the user can then read and modify the copy. When the user is finished, the modified data are written back to the file server. Examples of distributed file systems include Sun Microsystems' Network File System (NFS™), Novell Netware™, Microsoft's Distributed File System, and IBM/Transarc's DFS™. Transarc Corporation (Pittsburgh, Pa.) has developed a DMAPI implementation for its DFS called DMEpi. All of these distributed file systems, however, are still essentially single-node systems, in which a particular server controls any given file. The DMAPI and data management applications for such distributed file systems are essentially server functions and are not distributed among the client nodes.

IBM's General Parallel File System (GPFS) is a UNIX-style file system designed for IBM RS/6000 multiprocessor computing platforms, such as the SP™, and HACMP™ systems. GPFS, which runs in the AIX® operating system, allows applications on multiple nodes to share file data, without mediation of a file server as in distributed file systems. GPFS is described, for example, in a publication entitled "General Parallel File System for AIX: Concepts, Planning and Installation," which is available at www.rs6000.ibm.com/resource/aix_resource/sp_books/gpfs. GPFS supports very large file systems and stripes data across multiple disks for higher performance. GPFS is based on a shared disk model that provides low-overhead access to disks not directly attached to the application nodes and uses a distributed locking protocol to provide full data coherence for access from any node. These capabilities are available while allowing high-speed access to the same data from all nodes of the system. GPFS has failure recovery capabilities, allowing applications to continue running even when node or network component failures occur.

A series of patents to Schmuck et al. describe aspects of a shared parallel disk file system that are implemented in GPFS. These patents include U.S. Pat. Nos. 5,893,086; 5,940,838; 5,963,963; 5,987,477; 5,999,976; 6,021,508; 6,023,706; and 6,032,216, all of whose disclosures are incorporated herein by reference.

SUMMARY OF THE INVENTION

Preferred embodiments of the present invention provide a DMAPI that is suitable for use in a multi-node, parallel computing environment, and specifically for use with parallel file systems. Implementing DMAPI in a parallel file system, such as the above-mentioned GPFS, requires enhancements to the functions defined in the XDSM standard and alterations in certain basic definitions and assumptions that underlie DMAPI implementations known in the art. The basic semantics and functionality of the standard DMAPI model, however, are preferably preserved in the parallel system. DM application programmers are thus enabled to integrate data migration and other DM applications with the parallel file system in an immediate and straightforward manner.

In preferred embodiments of the present invention, computing nodes in a cluster are mutually linked by a suitable interconnection to a set of one or more block storage devices, typically disks. A parallel file system is configured so that all nodes in the cluster can mount the same set of file system instances. File data and metadata, on multiple logical volumes, may reside at different nodes. All of the volumes are accessible from all of the nodes via a shared disk mechanism, whereby the file data can be accessed in parallel by multiple tasks running on multiple nodes. The enhanced DMAPI provided for the parallel file system is used to support DM functions, such as automatic data migration, over all of the nodes and storage volumes in the cluster.

DM applications may run on substantially any of the nodes in the cluster, as either single-node or multi-node parallel applications. The DM application preferably starts by creating a session on one of the nodes and specifying the DM events that are to be reported to the session. The node on which the session is created is designated as the session node, and all specified events generated by file system operations are reported to the session node, regardless of the node at which the events are generated. Thus, an event may be generated by a file operation on one of the nodes, referred to herein as the source node, and delivered to a session on a different node, i.e., the session node. If the event is a synchronous event, requiring a response from the DM application before the file operation can continue, the source node will wait to carry out the requested file operation until the session node has sent its response back to the source node. In contrast, in DMAPI implementations known in the art all events and sessions take place on a single node.

It is a characteristic of parallel file systems that multiple instances of the same file system may be mounted on different nodes in the cluster. Therefore, in preferred embodiments of the present invention, when a DM application has created a session on one of the nodes and specified a disposition for an event in a certain file system, the event will be reported to the DM session whenever it occurs on any of the nodes on which the file system is mounted. In single-node systems, as assumed in the XDSM standard, the DMAPI reports a single mount event for each file system, as well as a single preunmount and unmount event. Once the file system is unmounted from the node, there can be no further events from this file system until the file system is mounted again. In the parallel file system of the present invention, however, the DMAPI is capable of handling multiple mount events—from all of the nodes on which the file system is mounted—as well as multiple preunmount and unmount events. As long as there is an instance of the file system mounted on at least one of the nodes, the DMAPI continues to report events to the DM session.

There is therefore provided, in accordance with a preferred embodiment of the present invention, in a cluster of computing nodes having shared access to one or more file systems in data storage using parallel file system software, a method for managing the data storage, including:

initiating a session of a data management application on a first one of the nodes;

receiving a request submitted to the parallel file system software at a second one of the nodes to mount one of the file systems in the data storage on the second one of the nodes; and sending a mount event message from the second node to the first node responsive to the request, for processing by the data management application on the first node.

Preferably, the method includes mounting first and second instances of the one of the file systems on the first and second nodes, respectively, responsive to the mount event message. Further preferably, the method includes receiving a further request at the second node to unmount the second instance of the one of the file systems at the second node, and sending, responsive to the further request, a preunmount event message to the first node, and then responding to the preunmount event message so as to permit unmounting of the second file system instance without unmounting the first file system instance. Most preferably, responding to the preunmount event message includes determining at the first node, responsive to one or more flags set in the preunmount event message, whether the request was submitted on the first node or on another one of the nodes.

Preferably, the method includes receiving the preunmount event message at the first node, obtaining a data management access right from a physical file system (PFS) software component at the first node responsive to the preunmount event message, and processing the preunmount event message using the access right.

In a preferred embodiment, receiving the request includes receiving first and second requests to mount different ones of the file systems in the data storage, and receiving the further request includes receiving further first and second requests to unmount the different ones of the file systems, and sending the preunmount event message includes, responsive to dispositions set for the different ones of the file systems, sending a first preunmount event message to the first node responsive to the first unmount request, and sending a second preunmount event message responsive to the second unmount request to a further node, on which a further data management application session has been initiated.

Preferably, responding to the preunmount event message includes sending a reply to the message from the first node to the second node, and the method includes, responsive to the reply, unmounting the second file system instance and sending an unmount event message from the second node to the first node. Most preferably, the method includes determining at the first node, responsive to one or more flags set in the unmount event message, whether the request was submitted on the first node or on another one of the nodes.

Preferably, initiating the session includes initiating the session in accordance with a data management application programming interface (DMAPI) of the parallel file system software, and receiving the request and sending the mount event message include processing the request and sending the message using the DMAPI. Typically, the method includes receiving an unmount request to unmount the file system from the second node using the DMAPI, and sending a preunmount event message to the first node responsive to the unmount request using the DMAPI, for processing by the data management application on the first node. Preferably, the method further includes sending a reply to the preunmount event message from the first node to the second node using the DMAPI, and, responsive to the reply, unmounting the file system at the second node, and sending an unmount event message to the first node using the DMAPI.

Further preferably, the method includes receiving and processing the mount event message at the first node using one or more functions of the DMAPI called by the data management application. Additionally or alternatively, sending the event message includes sending the message for processing in accordance with a disposition specified by the data management application using the DMAPI for association with an event generated by the file operation. In a preferred embodiment, the method includes invoking a function of the DMAPI to obtain mount information regarding the one of the file systems, and wherein in a response provided by the function, one or more flags are set to indicate whether the one of the file systems is mounted on the first node or on another one of the nodes in the cluster or on both the first node and on another one of the nodes in the cluster.

Preferably, the method includes receiving a response to the mount event message from the data management application on the first node, and mounting an instance of the one of the file systems on the second node subject to the response from the data management application on the first node.

In a preferred embodiment, the method includes receiving a further request submitted to the parallel file system software to mount the one of the file systems on a further one of the nodes, and sending a further mount event message responsive to the further request for processing by the data management application on the first node. The further one of the nodes may be the first node.

In a further preferred embodiment, initiating the session of the data management application includes initiating a data migration application, so as to free storage space on at least one of the volumes of data storage.

There is also provided, in accordance with a preferred embodiment of the present invention, computing apparatus, including:

one or more volumes of data storage, arranged to store data in one or more file systems; and a plurality of computing nodes, linked to access the volumes of data storage using parallel file system software, and arranged so as to enable a data management application to initiate a data management session on a first one of the nodes, so that when a request is submitted to the parallel file system software at a second one of the nodes to mount or unmount one of the file systems in the data storage on the second node, a suitable event message is sent from the second node to the first node responsive to the request, for processing by the data management application on the first node.

There is additionally provided, in accordance with a preferred embodiment of the present invention, a computer software product for use in a cluster of computing nodes having shared access to one or file systems in data storage, accessed using parallel file system software, the product including a computer-readable medium in which program instructions are stored, which instructions, when read by the computing nodes, cause a session of a data management application to be initiated on a first one of the nodes, and in response to a request submitted to the parallel file system software at a second one of the nodes to mount or unmount one of the file systems in the data storage on the second node, cause the second node to send a suitable event message to the first node, for processing by the data management application on the first node.

The present invention will be more fully understood from the following detailed description of the preferred embodiments thereof, taken together with the drawings in which:

DETAILED DESCRIPTION OF PREFERRED EMBODIMENTS

GLOSSARY

Figure 1:
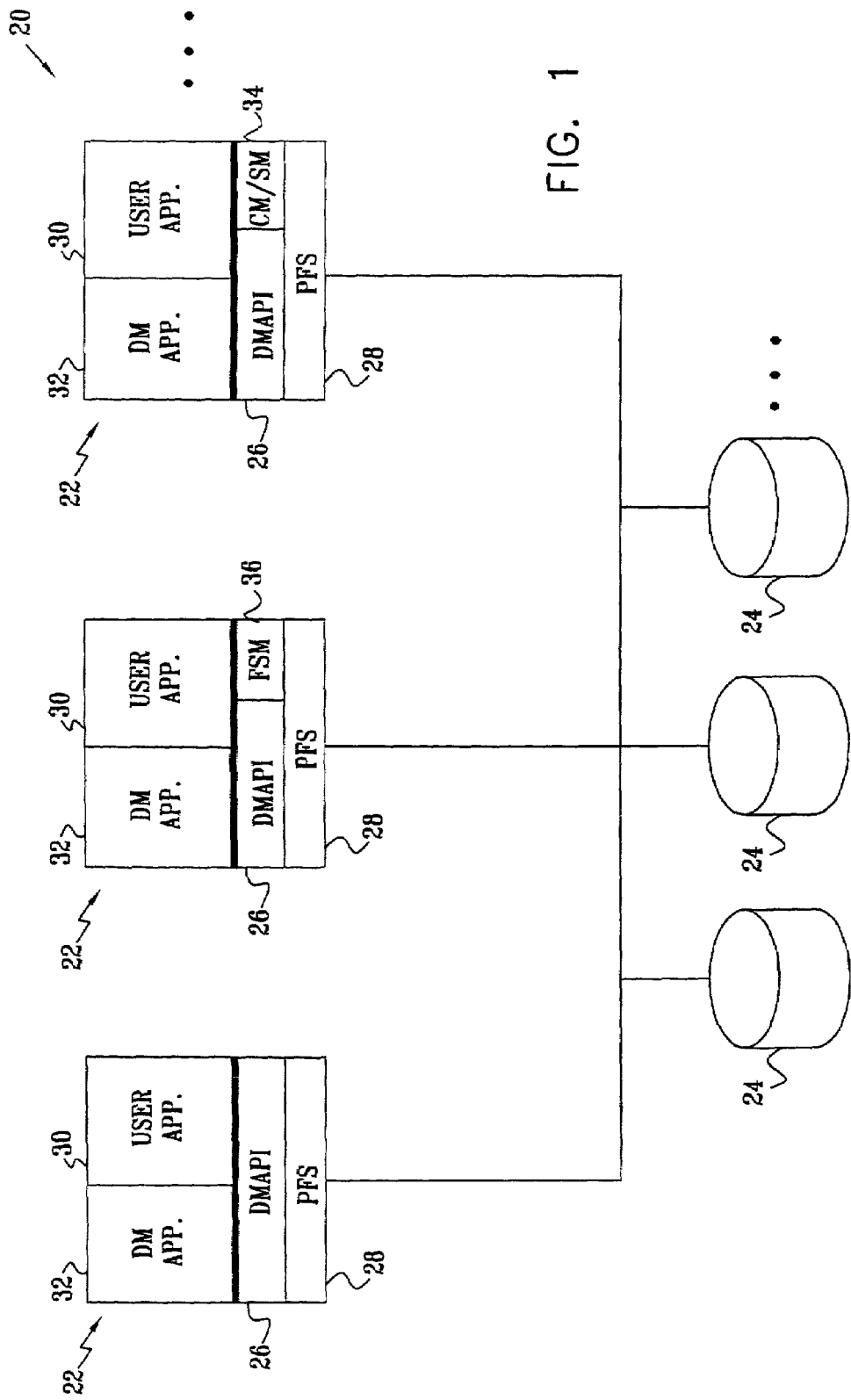
FIG. 1 is a block diagram that schematically illustrates a cluster of computing nodes with a parallel file system, in accordance with a preferred embodiment of the present invention.

The following is a non-exhaustive list of technical terms that are used in the present patent application and in the claims. The list is provided here for the convenience of the reader. Certain of the items in the list are specific to preferred embodiments of the present invention. These terms are described at greater length in the Detailed Description following the Glossary.

Cluster: A collection of computers interconnected by a communication mechanism, typically a high-performance switch or a network. The computers in the cluster collaborate with each other in computations and share data resources.

Node: A computer that is part of a cluster. Each node in the cluster has a cluster-wide unique identity.

File System: A hierarchical collection of files and file directories that are stored on disk and have an identified root, and are accessed using a predefined interface. Typically, such interfaces follow the prescription of standards, such as Posix. The term "file system" is also loosely used to describe the data and metadata contained in the file system.

File System Instance: A file system that is mounted on a computer. In a cluster, a given file system can have multiple file system instances, each instance mounted on a different node.

Physical File System (PFS): A software component that manages collections of data on disks, typically using mechanisms and interfaces prescribed by the X/Open and Posix standards. The PFS is one of layers in the hierarchy of interfaces that are used to support the file system and to enable software applications to access the file data. Multiple different PFSs may coexist on a computer, each used to implement a different type of file system. The PFS usually runs in the kernel, with possible extensions running as daemons in user space.

Parallel File System: A PFS running on a cluster of nodes, which enables all nodes in the cluster to access the same file data concurrently. Preferably, all nodes share in the management of the file systems. Any of the nodes can perform any role required to manage the file systems, with specific roles assigned to particular nodes as needed. The term "parallel file system" is also loosely used to describe a file system that is managed by a PFS software component, as defined in this paragraph.

DMAPI: Data Management Application Programming Interface, as specified in the above-mentioned XDSM standard. This term is also used to denote the software sub-component implementing the interface in the PFS.

Session Node: A node in a cluster on which one or more data management (DM) sessions have been created. (The term "data management" is used as defined in the XDSM standard.) The term is also used to identify a specific node at which a specific session exists.

Source Node: A node in a cluster that generates DM events. (The term "events" is similarly used as defined in the XDSM standard.) The term is also used to identify a specific node that generated a specific event.

Session Manager (SM): A node in a cluster that is assigned the role of coordinating the creation and maintenance of DM sessions and DM event dispositions on the nodes in the cluster. Typically, the sessions may be created on any of the nodes, including the session manager node.

File System Manager (FSM): A node in a cluster that is assigned the role of managing the metadata of a specific file system. The node coordinates among all the instances of the file system that are mounted on the different nodes in the cluster.

Persistent Data: Data used by a software component on a computer or a cluster of nodes, which is not lost when the component crashes. Persistent data can be recovered and restored when the component recovers.

Single Node Failure: A failure that occurs on a single node in a cluster. Services provided by other nodes in the cluster are normally not affected by this failure. The term is specifically used to describe the failure of the PFS software component. All file systems managed by the failing PFS become inaccessible on the failing node, but typically remain accessible on other nodes in the cluster.

Total PFS Failure: Failure of the PFS software component on all the nodes in a cluster. All file systems managed by the failing PFS become inaccessible on all nodes in the cluster.

File System Failure: Failure of a file system instance on a single node, possibly due to disconnection from disks or from other nodes in a cluster. The failing file system instance becomes inaccessible on the node where the failure occurred. The term is also used to describe the failure of multiple (or all) instances of the same file system on any node in the cluster.

Session Failure: Failure of the PFS on a session node, at which one or more sessions exist for monitoring file systems managed by the failing PFS. Such sessions can no longer be used, and are hence called failed sessions. When the PFS recovers, the sessions can be recreated. The term is also used to identify the failure of a specific session on a specific node.

SYSTEM OVERVIEW

FIG. 1 is a block diagram that schematically illustrates a cluster 20 of computing nodes 22, running a parallel file system, identified as a physical file system (PFS) 28, in accordance with a preferred embodiment of the present invention. Nodes 22 are connected to one another and to multiple disks 24 by a suitable communication mechanism, such as a high-capacity switch or network (not shown). The disks may thus be accessed in parallel by any of the nodes. Preferably, cluster 20 comprises an IBM SP or HACMP system, and PFS 28 comprises GPFS, running on the AIX operating system, as described in the Background of the Invention. Alternatively, nodes 22 may be arranged in other cluster configurations, and PFS 28 may comprise other types of parallel file systems and operating platforms. In this regard, it is noted by way of example that the IBM GPFS file system has been ported to other platforms, such as Linux.

All nodes 22 in cluster 20 can mount the same file systems. The file data and metadata of the file systems are striped across multiple logical volumes, each of which may reside on a different node 22. All of the volumes are accessible from all of the nodes via a shared disk mechanism, preferably the virtual shared disk (VSD) mechanism used by GPFS. File data can thus be accessed in parallel by multiple tasks on multiple nodes. Parallel access is preferably protected by a byte range lock, as described in the above-mentioned patents by Schmuck et al.

One of nodes 22, is selected to serve as cluster configuration manager (CM) 34. If the CM fails, another node takes its place. The CM performs various global coordination duties in cluster 20. These duties include appointing one of the nodes to serve as file system manager (FSM) 36 for each file system in the cluster. The FSM serves all of the nodes in the cluster that mount the given file system. It is responsible for metadata management, which is used to maintain the file system instances on all of the nodes in a consistent state.

Nodes 22 are capable of running both user applications 30 and data management (DM) applications 32. These applications may be either single-node or parallel, multi-node applications, which take advantage of PFS 28 to access disks 24. A Data Management Application Programming Interface (DMAPI) 26 is preferably integrated into physical file system (PFS) 28. DM applications 32 use DMAPI 26 to track and control file operations and to manage file data of file systems in cluster 20, as described in detail hereinbelow. For this purpose, DMAPI 26 uses mechanisms and infrastructure provided by the PFS, including communication, memory management, locking and synchronization. In a similar vein, configuration manager 34 of PFS 28 also serves as a session manager (SM) for DMAPI 26.

PFS 28 with DMAPI 26 is typically supplied as a software package for installation on cluster 20, with or without a complete operating system, such as AIX. This software may be downloaded to the cluster in electronic form, over a network, for example, or it may alternatively be supplied on tangible media, such as CD-ROM, for installation on the cluster nodes.

Figure 2:
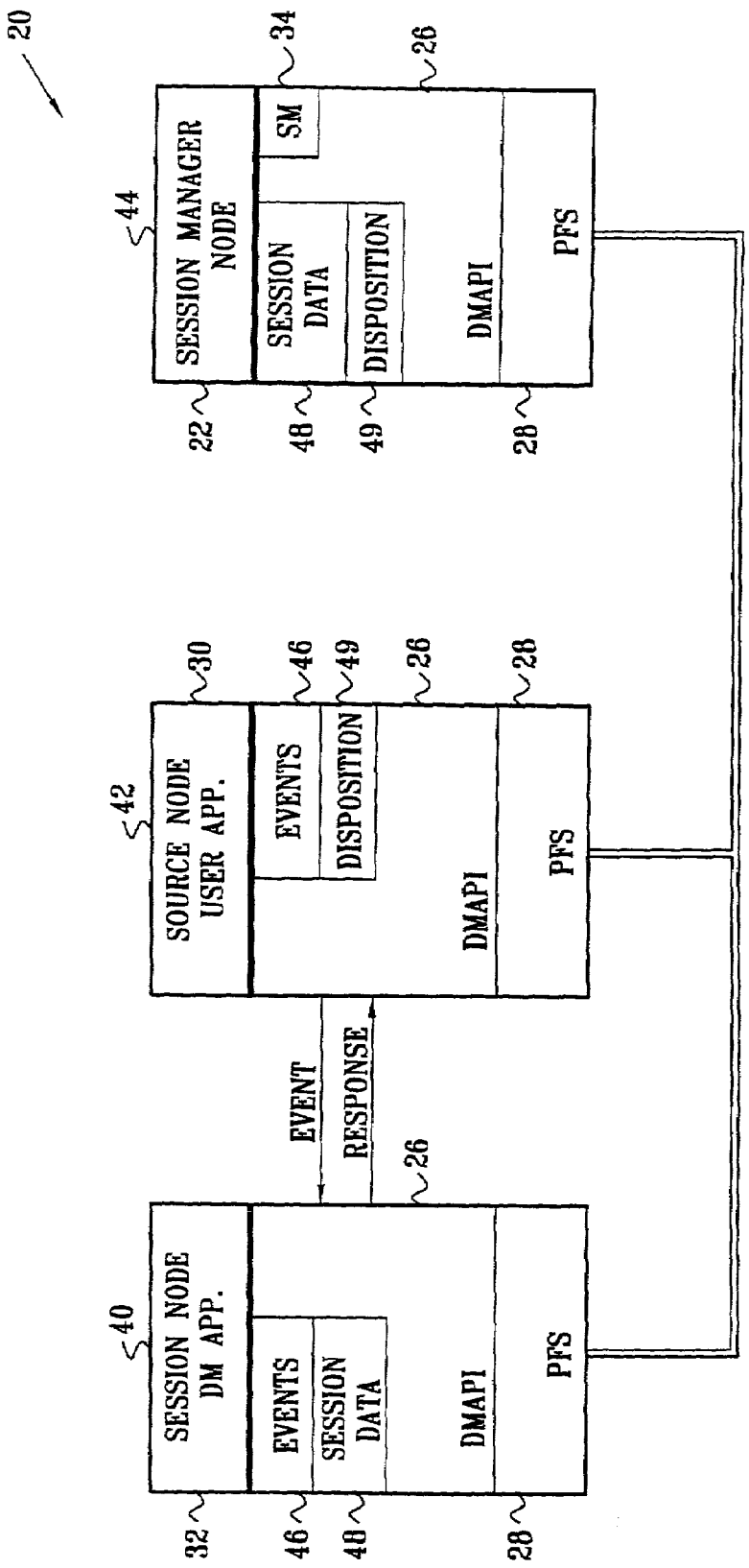
FIG. 2 is a block diagram that schematically shows details of the parallel file system of FIG. 1, in accordance with a preferred embodiment of the present invention.

FIG. 2 is a block diagram that schematically shows further details of the software structure and operation of PFS 28, and particularly of DMAPI 26, in accordance with a preferred embodiment of the present invention. The figure shows a session node 40, a source node 42 and a session manager (SM) node 44, all of which are nodes 22 (FIG. 1) in cluster 20. DM application 32 is shown to be running on node 40, while user application 30 is running on node 42. Typically, both DM application 32 and user application 30 may be distributed applications, running on multiple nodes simultaneously, and possibly running together on the same node. For the sake of simplicity of illustration, however, and without loss of generality, only a single node of each type is shown in FIG. 2. Similarly, although SM 34 is shown as running on a separate session manager node 44, it may alternatively run on any of the nodes in cluster 20, including session node 40 and source node 42.

In an alternative embodiment of the present invention, not shown in the figures, DM sessions are explicitly replicated on all nodes in the cluster. DM events generated at a source node are then delivered to a session at the source node itself. This embodiment requires that DM applications be defined as multi-node, parallel applications, unlike DM applications known in the art. Each event is handled by the DM application instance on the source node at which it originated, while consistency is maintained among the instances using methods known in the art of parallel applications.

SESSIONS AND EVENT HANDLING

Upon initiation of DM application 32, the application creates a DMAPI session on session node 40. Dispositions 49 of enabled events 46 are maintained on source node 42 and on SM node 44. A list of enabled events can be associated individually with a file and globally with an entire file system. Conflicts between individual and global event lists are preferably resolved in favor of the individual list. Preferably, event lists are persistent and are kept with the file system in stable storage. Dispositions are not persistent and must be set explicitly for each file system after PFS 28 is started and sessions are created.

When user application 30 on source node 42 invokes a file operation that generates an enabled event having a disposition in disposition list 49, DMAPI 26 sends the event to an event queue on session node 40. (Node 42 is referred to as the source node, because it is the source of the generated event in the present example.) When the event is a synchronous event, PFS 28 on the source node waits for the response of the DM application before allowing the file operation to proceed. The process of sending events and responses is described in greater detail hereinbelow with reference to FIG. 3.

In practice, multiple DM applications and multiple sessions may run simultaneously in cluster 20. Each session can monitor multiple file systems. At the same time, multiple DM application threads can access the same file in parallel. Moreover, a given file system may be monitored by multiple sessions, created by the same DM application or by different DM applications running concurrently, on the same node or on different nodes. When there are multiple sessions monitoring a given file system, event dispositions are partitioned among the sessions by event type, so that there is no ambiguity as to which session will handle each type of event. On the other hand, multiple sessions can also be used to monitor different, respective file systems.

DM application 32 can set the disposition of events or change the disposition of events in a given file system from one session to another, as noted above, using the DMAPI dm_set_disp( ) function. This call can come from any node at substantially any time. The node initiating the change notifies SM 34, which accordingly updates dispositions 49 in its own, centrally-maintained data structures. The SM sends the changes to the relevant FSM 36, which then sends the information to all nodes on which the file system is mounted. When a new FSM is appointed (at the first mount of a given file system, or after failure of the previous FSM), it obtains the event dispositions form SM 34. When additional nodes mount the file system, they obtain the dispositions from the relevant FSM. This approach guarantees that the FSM and all nodes mounting the file system will always have the most current event dispositions, while maintaining efficiency of communications by disseminating information only to the nodes for which it is relevant.

SM 34 is responsible for coordinating among the session nodes, in order to ensure that all session identifiers (IDs) are unique and that event disposition partitioning is consistent. All nodes 22 in cluster 20 know the identity of the session manager.

A new session is created by invoking the DMAPI function dm_create_session( ) on the session node, which then sends a message to SM 34. The SM generates a session ID, adds the session to its list of all sessions in the cluster, broadcasts the session details to all nodes in the cluster, and returns the session ID to the session node. The session becomes valid only after session node 40 and SM 44 complete all of these messages. Session IDs are preferably unique over time in the cluster, most preferably consisting of a time stamp and the node ID of SM 34. The use of globally-unique session IDs, which are never reused, prevents naming consistency problems in the multinode environment.

A new session node assumes an existing session by invoking dm_create_session( ), specifying the existing session ID. DMAPI 26 sends the ID to SM 34, which updates the session details in its list. An existing session will be assumed in this manner only after a session node failure, as described below. The session ID does not change when an existing session is assumed. dm_create_session( ) can also be used to modify the session information string of an existing session. This call can be made only on the session node.

A session can register (or unregister) to receive an event when a file system is mounted on one of nodes 22 by calling the DMAPI function dm_set_disp( ) on the session node. DMAPI 26 informs SM 34, and the SM keeps track of the sessions that are registered for the mount event. When a node performs a mount operation, it obtains from the SM a list of sessions that are registered for the mount event.

A session may be destroyed by invoking the DMAPI function dm_destroy_session( ) on session node 40. In this case, the session node sends a message to SM 34, which removes the session from its list and broadcasts the change to all nodes.

For efficient event generation and recovery from PFS failure, the session and event information is replicated on multiple nodes in cluster 20. Preferably, as shown in FIG. 2, information regarding each outstanding event 46 is maintained on both session node 40 and on source node 42. Session data 48 are maintained on session node 40 and on session manager node 44. Preferably, every node in the cluster maintains partial information on every session in the cluster, including session ID, session node address, whether or not the session is registered for the mount event, and a short prefix of the session information string. Dispositions 49 are maintained by SM 34 on node 44, and on all nodes on which the monitored file system is mounted, including source node 42.

SM 34 is responsible for disseminating changes in session details. When the SM is notified of a change in the state of one of the sessions, it broadcasts the change to all of the nodes in the cluster.

Replication of the session information and event dispositions on multiple nodes allows DMAPI events to be generated efficiently, without repeatedly communicating session and disposition information between nodes. It also supports efficient recovery from single node failure without the necessity of using stable storage. Methods for handling session failures in system 20 are described hereinbelow with reference to FIG. 6.

Figure 3:
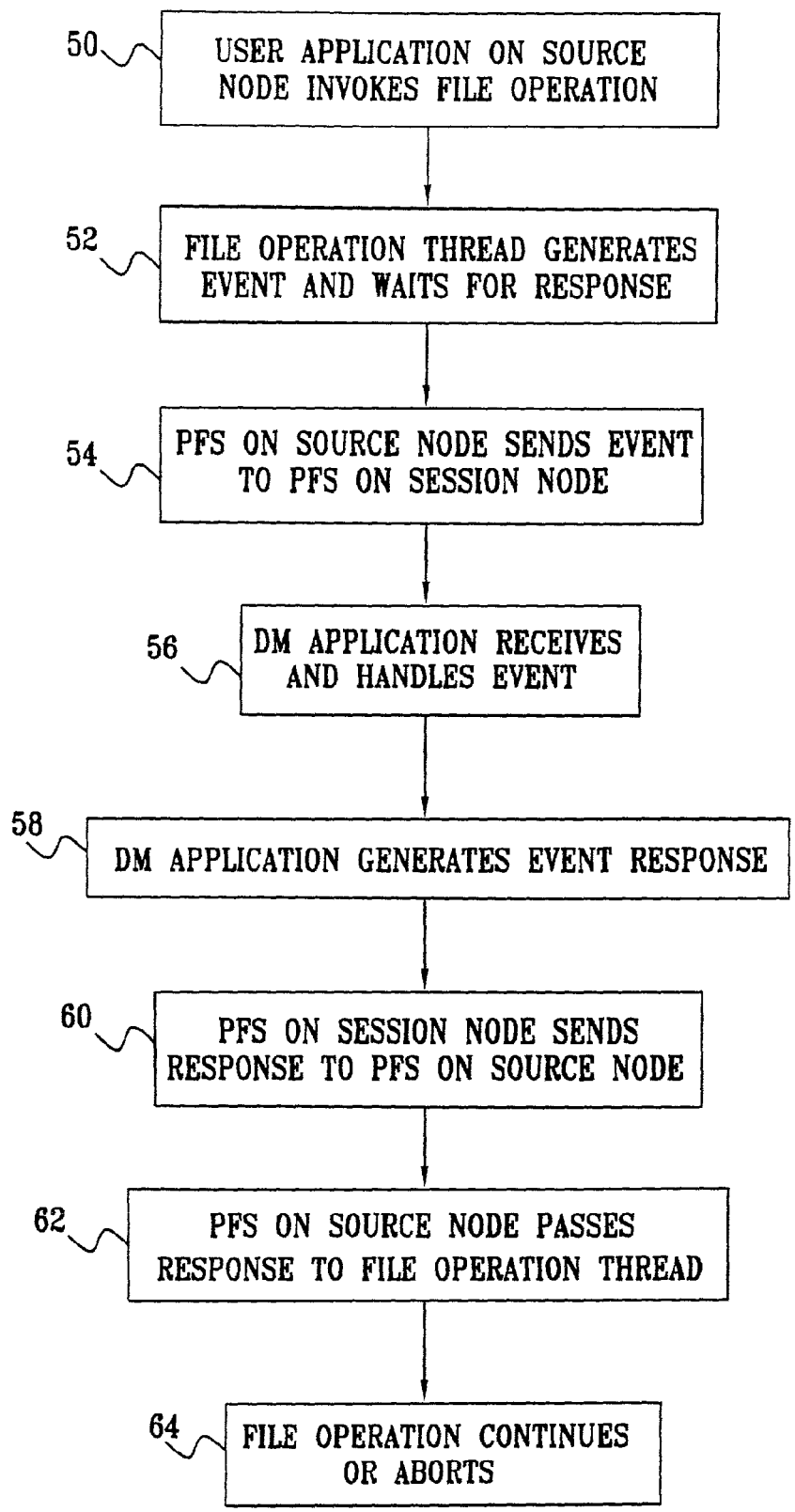
FIG. 3 is a flow chart that schematically illustrates a method for handling a DMAPI event generated by a file operation in a parallel file system, in accordance with a preferred embodiment of the present invention.

FIG. 3 is a flow chart that schematically illustrates a method for handling a DMAPI event generated in cluster 20, in accordance with a preferred embodiment of the present invention. The method begins when user application 30 invokes a file operation on source node 42, at an invocation step 50. It is assumed that this file operation generates an event that appears in the list of enabled events 46 and dispositions 49, which are furnished by SM 44 to all nodes in system 20 that have mounted instances of the file system in question. Typically, if the event is enabled, but there is no disposition listed, DMAPI 26 will return an error message to the user application.

Event generation is preferably implemented in the virtual file system (VFS) interface layer of PFS 28. The definition of the VFS layer and its interaction with the PFS are well known in the art of UNIX-type operating systems, including the above-mentioned IBM AIX operating system. The integration of DMAPI 26 with PFS 28 includes augmenting the file operations in the PFS with code for event generation. In an event generation step 52, this code causes the file operation client thread invoked at step 50 to generate the prescribed event. If the event is an asynchronous event, PFS 28 on source node 42 sends an appropriate event message to the session on session node 40, and the requested file operation is then immediately free to proceed on source node 42. In the example shown in FIG. 3, however, the event is assumed to be a synchronous event, which causes the file operation thread to block and await a response from the DM application before proceeding with PFS processing.

PFS 28 on source node 42 sends an event message to PFS 28 on session node 40, in accordance with the specified event disposition, at an event sending step 54. The event message header preferably carries a field, ev_nodeid, which is added to the dm_eventmsg structure defined in the above-mentioned XDSM specification in order to identify source node 42 (since events can be generated at any node in cluster 20). In implementations based on GPFS in the SP environment, the node identifier is preferably its System Data Repository (SDR) node number. The event message is enqueued at session node 42.

DM application 32 on session node 40 receives and handles the event sent by PFS 28, at an event handling step 56. For this purpose, the DM application makes use of function calls provided by DMAPI 26, such as dm_get_events( ), as specified by the XDSM standard. These function calls are implemented as kernel calls from the user space of the DM application into PFS 28, based on linking the DM application with an interface library of DMAPI function calls, as is known in the art. DM function calls enter the PFS kernel on the DM application thread. The processing may involve additional PFS daemon threads, and may proceed both in user and kernel space.

After DM application 32 has processed the event, it generates its response to the event, at a response step 58, using the DMAPI function call dm_respond_event( ). Session node 40 sends the response back to source node 42, at a response sending step 60. The PFS on node 42 passes the event response to the file operation thread, at a response reception step 62. If the response indicates that the operation should be aborted, the file operation returns to user application 30 without further PFS processing; otherwise, the file operation continues its PFS processing until completion, at a continuation or aborting step 64.

MOUNTING AND UNMOUNTING FILE SYSTEM INSTANCES

PFS 28 generates a mount event each time a mount operation is performed on one of the nodes in cluster 20. Similarly, each unmount operation on any node generates preunmount and unmount events, assuming such events are enabled and have a disposition. DM application 32 should therefore be capable of handling multiple mount, preunmount and unmount events, corresponding to multiple instances of the file system that are mounted on multiple nodes. By contrast, in single-node systems, as implied by the XDSM standard, DM applications are not required to deal with more than a single mount, preunmount or unmount event per file system. As a result, in single-node systems, the preunmount and unmount events always follow the mount event in serial order.

In PFS 28, on the other hand, there is not a predictable serial relationship between all of the mount, preunmount and unmount events of each file system. Without serialization of all mount and unmount operations of the file system, there is no practical way to designate the first or last mount or unmount. There need not even be a match between the number of mount events and the number of preunmount or unmount events for a given file system, since an unmount that is initiated internally by PFS 28 (due to forced unmount or PFS shutdown, for example) will not generate any events. Therefore, DMAPI 26 requires methods for handling mount, preunmount and unmount events that extend those provided by the XDSM standard.

To provide additional information to DM application 32, two new flags, DM_LOCAL_MOUNT and DM_REMOTE_MOUNT, not defined in the XDSM standard, are preferably added to the mode fields in the message structures of mount, preunmount and unmount events (the me_mode and ne_mode fields, respectively). When DM_LOCAL_MOUNT is set, the mount or unmount operation concerned is local to the session node. When DM_REMOTE_MOUNT is set, the operation is at a node that is remote from the session node. In this case, the ev_nodeid field mentioned above can be used by the session node to identify the source node on which the mount or unmount operation is to be performed. These flags are also used in the dm_mount_event data structure returned by the DMAPI function dm_get_mountinfo( ). This function can be called from any node, even if the file system is not mounted on that node. At least one of the two flags will be set in the data structure that is returned, as long as the file system is mounted on one or more of the nodes in cluster 20.

DM application 32 can make good use of the enhanced node information provided by the dm_get_mountinfo( ) function for processing of mount and preunmount events. For example, before the DM application responds to a mount event received from a node that is not the session node, it can invoke dm_get_mountinfo( ) to determine whether the relevant file system is already mounted locally at the session node. If not, the DM application preferably performs a local mount.

Mount events are preferably enqueued in the session queue ahead of other events, in order to improve the response time of PFS 28 to mount operations when the queue is busy.

Figure 4:
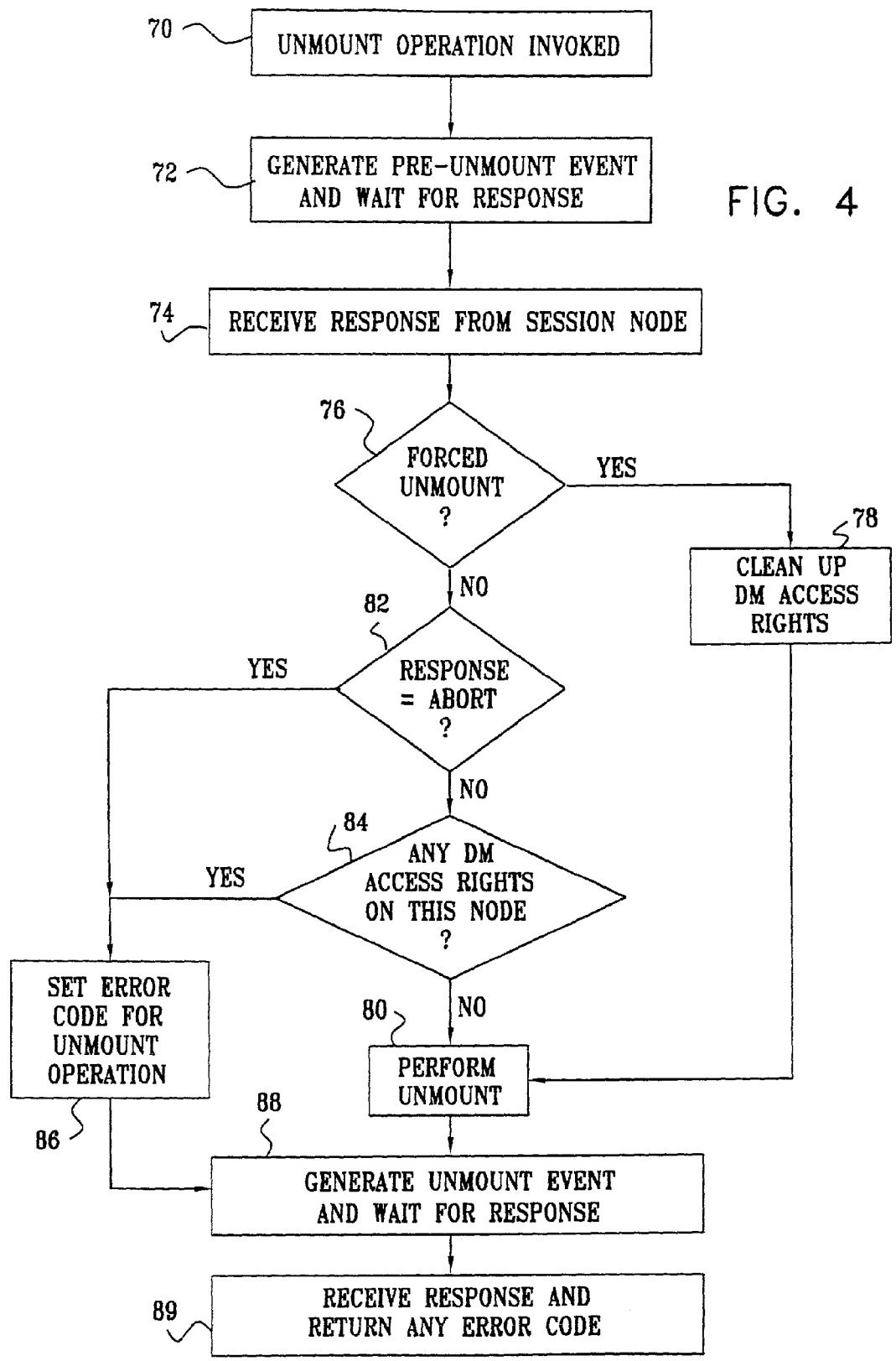
FIG. 4 is a flow chart that schematically illustrates a method for unmounting an instance of a parallel file system, in accordance with a preferred embodiment of the present invention.

FIG. 4 is a flow chart that schematically illustrates a method for performing an unmount operation on source node 42, in accordance with a preferred embodiment of the present invention. This method is used whenever an unmount operation is invoked, at an unmount invocation step 70. DMAPI 26 on source node 42 generates a preunmount event message and waits for the response from the DM application, at an event generation step 72. This message is received and processed by DMAPI 26 on session node 40. DMAPI 26 on source node 42 receives the response from session node 40, at a response receipt step 74.

DMAPI 26 checks whether the unmount operation is a forced unmount, at a force checking step 76. In such a case, any outstanding access rights for the relevant file system on source node 42 are released, at a cleanup step 78. DMAPI 26 then permits the unmount to proceed, at an unmounting step 80.

On the other hand, if the unmount is not a forced unmount, DMAPI 26 checks whether it has received an "abort" response from session node 40, at an abort checking step 82. If so, the unmount operation is failed. Similarly, the unmount is failed if there are still DM access rights to the file system on source node 42, at an access right checking step 84. In either of these cases, an error code is set for the unmount operation on node 42, at an error step 86. Only if there are no outstanding access rights on node 42 can the unmount proceed normally at step 80.

Whether the unmount was performed successfully (step 80) or not (step 86), DMAPI 26 generates an unmount event and waits for a response, at an unmount event generation step 88. After receiving the response, any error code that was set at step 86 is returned by the unmount operation, at an error return step 89.

DM ACCESS RIGHTS

DM applications acquire DM access rights to file objects and associate them with event tokens. DM access rights are required in some of the DMAPI functions specified in the XDSM standard (which are implemented in the multi-node environment by the present invention). In order to avoid overhead that would be incurred by managing access rights distributively in the cluster setting, all of the access rights associated with a given event are preferably managed by the corresponding session node. Thus, all requests to acquire, change, query or release DM access rights must be invoked by the DM application on session node 40.

File operations must abide by DM access rights. In particular, file operations that conflict with DM access rights must be blocked while the access is held by the DM application. Conversely, the DM application must be prevented from acquiring an access right while a conflicting file operation is in progress. Preferably, these access rights are implemented using the internal locking mechanisms of PFS 28, such as the GPFS locking mechanisms described in the above-mentioned patents by Schmuck et al.

DM access rights in cluster 20 are preferably treated as an additional file lock in the hierarchy of locks acquired during file access. This approach enables acquiring and releasing access rights efficiently, using existing, highly-optimized locking mechanisms of the PFS. This additional lock is referred to herein as the "DM lock." The lock characteristics are affected by the type of access (shared or exclusive) and the type of thread acquiring the lock (file operation thread or data management operation thread). Existing file locks (such as those described by Schmuck et al.) cannot be used for this purpose, since DM access rights are held across multiple kernel calls and can be shared among DM application threads without going through the kernel. The existing file locks are still required to synchronize access to file data, even while a DM access right is held. Preferably, to prevent deadlocks, the DM lock is acquired before any other locks in the file locking hierarchy.

Table I below is a lock conflict table that defines DM access rights semantics in cluster 20. Four lock modes are used:

DMX—data management exclusive access.
DM—data management shared access.
FSX—file system exclusive access.
FSS—file system shared access.

An "X" in the table indicates a conflict between the corresponding modes.

TABLE I

| | DM ACCESS RIGHTS | | | |
|---|---|---|---|---|
| | FSS | FSX | DMS | DMX |
| FSS | | | | X |
| FSX | | | X | X |
| DMS | | X | | X |
| DMX | X | X | X | X |

DMX and DMS modes are used only in DM operations. They provide exclusive and shared access rights, respectively, for each individual DM operation, as defined by the XDSM standard.

FSX and FSS modes are used in file operations, in order to prevent DM applications from acquiring a DM access right while a conflicting file operation is in progress. FSX prevents acquisition of any DM access rights. FSS prevents acquisition of exclusive DM access rights, but does not conflict with shared DM access rights. Typically, a file operation that modifies the data in a file object or destroys the object will acquire a FSX lock, whereas a FSS lock will suffice for other file operations. There is no conflict between the FSX and FSS modes, because file operations never compete with one another for DM locks. This feature is important in reducing the performance impact of the additional DM lock in parallel file systems, since locking conflicts in such systems are resolved by communication among multiple nodes.

In the GPFS parallel file system, as described by Schmuck et al., file locking is implemented using a token manager, which grants lock tokens to nodes upon request and revokes them when other nodes make conflicting requests. For the DM lock, after the token manager grants a FSX or FSS token to a node, there will be no need to revoke the token until a DM application requests a DM lock on the file. For files being used actively by a user application, interference by typical DM applications is generally expected to be minimal. The added overhead in normal file operations that is associated with DM lock acquisitions and revocations should therefore be small.

While a file operation holds its DM lock only for the duration of the operation (a single kernel call), a DM application can hold its DM lock across many DMAPI function calls (multiple kernel calls). This continuous holding of the DM lock is achieved by associating the access right in question with an event token, which can be presented in subsequent DMAPI calls.

DMAPI functions can be invoked without presenting a DM token (DM_NO_TOKEN), in which case DM access rights are acquired only for the duration of the given DMAPI function. For this purpose, a FSS or FSX lock is sufficient, instead of the more restrictive DMS or DSM lock. The tokenless DMAPI call thus uses the same type of DM locking as do regular file operations.

INVOKING DMAPI FUNCTIONS IN A CLUSTER

In preferred embodiments of the present invention, in the multi-node environment of cluster 20, DMAPI functions can be called from any of the nodes in the cluster. Functions that do not change the state of a session or event can be invoked freely at any node, in order to enable DM applications to exploit the inherent parallelism of the PFS. dm_punch_hole( ) and dm_read_invis( ) are examples of such non-state-changing DMAPI functions. On the other hand, DMAPI functions that change the state of a session or event must be invoked on the session node.

Figure 5:
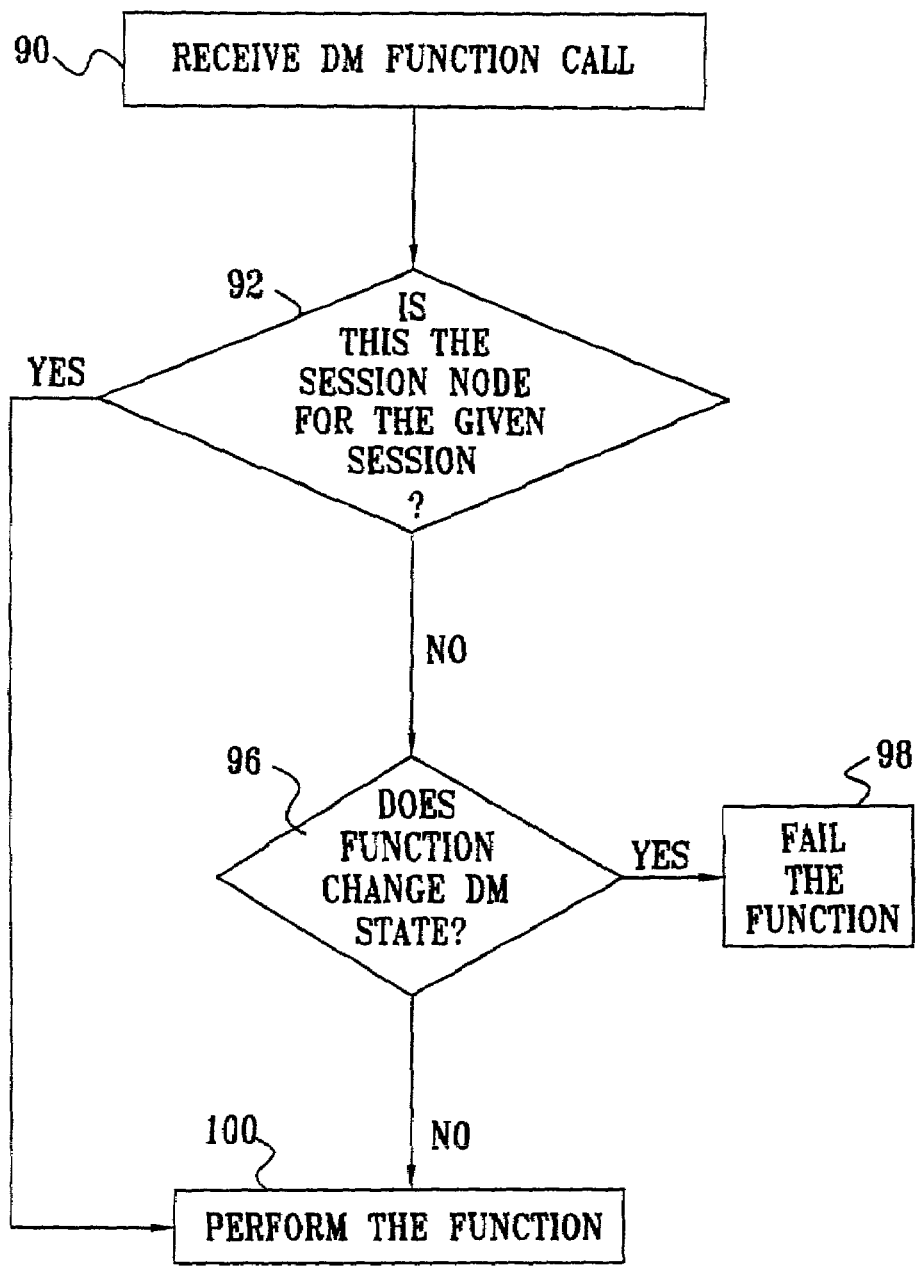
FIG. 5 is a flow chart that schematically illustrates a method for handling a DMAPI function call in a parallel file system, in accordance with a preferred embodiment of the present invention.

FIG. 5 is a flow chart that schematically illustrates a method for processing a DMAPI function call that provides as parameters a session ID and event token, in accordance with a preferred embodiment of the present invention. This method is invoked when DMAPI 26 receives a function call from DM application 32 on node 22, at a function calling step 90. DMAPI 26 ascertains whether node 22 is the session node (such as node 40) for the session, at a session node determination step 92. If so, the required function is carried out by PFS 28, in a function performing step 100.

If the node invoking the function call is not the session node for this session, DMAPI 26 determines whether this function changes the state of the DM event or session (as specified by the XDSM standard), at a state change determination step 96. If so, the requested function is failed, and DMAPI 26 returns an error to DM application 32, at a failure step 98.

On the other hand, if this is not the session node, and the DMAPI function does not change the current event or session state, the call proceeds in step 100 as long as the session exists on some node, and the required event token is presented. Optionally, the DM application on the requesting node caches a copy of the token.

DMAPI FAILURE AND RECOVERY MECHANISMS

The failure model defined in the XDSM standard is geared to a single-node system, in which two types of DMAPI-related failures may occur: DM application failure or total PFS failure. When only the DM application fails, DMAPI resources, such as sessions and events, remain intact. As a result, file systems may become unstable, since there may be pending events and blocked user threads, waiting for response by the DM application. To deal with this situation, the DM application must restart and pick up any existing session where it left off. For this purpose, the XDSM standard provides DMAPI functions that enable the restarted DM application to query the session queue and handle any pending events.

Recovery from total PFS failure is a matter for the PFS to handle and is beyond the scope of the XDSM standard. When the PFS fails, all non-persistent DMAPI resources are lost. The PFS is expected to clean up its own state when it is restarted. The DM application can then restart as well. Since sessions are not persistent, there is no need in this case for session recovery.

These two models do not describe all of the possible types of failure that may occur in a multi-node parallel file system, as is used in preferred embodiments of the present invention. The multi-node system should also be capable of dealing with single-node failures, in which a file system instance or the PFS may fail on one or more of the nodes, while continuing to work run on the others. In such a case, DMAPI 26 should also continue to operate and enable file access on the surviving nodes, while the PFS recovers on the failed nodes. A distributed DM application may likewise continue running on some nodes, while other nodes (possibly including the session node for the DM application) have failed and are in the process of recovery.

Single-node failure may occur in the multi-node system either when a specific file system becomes inaccessible on the node or when the entire PFS fails on the node. In the latter case, all file system instances that are managed by the PFS become inaccessible on that node. Handling of and recovery from a single node failure depend on whether the failed node is a source node or a session node. When source node 42 fails (FIG. 2), events generated by that node become obsolete. If such events were already enqueued at session node 40, DM application 32 will continue to process the events. The processing may be unnecessary, since there is no longer any file operation waiting for the response, but is harmless aside from the attendant loss in efficiency.

Session node failures are more difficult to handle. When a session node fails, all DMAPI resources, including all sessions, are lost on the failing node, although not on other, surviving nodes. File operations on the surviving nodes may still be blocked, however, waiting for response from an event previously sent to a failed session. It is therefore important to recover the session, possibly on another node, and to resume handling of pending events, so that file operations on the surviving nodes will be able to continue without failure.

Figure 6:
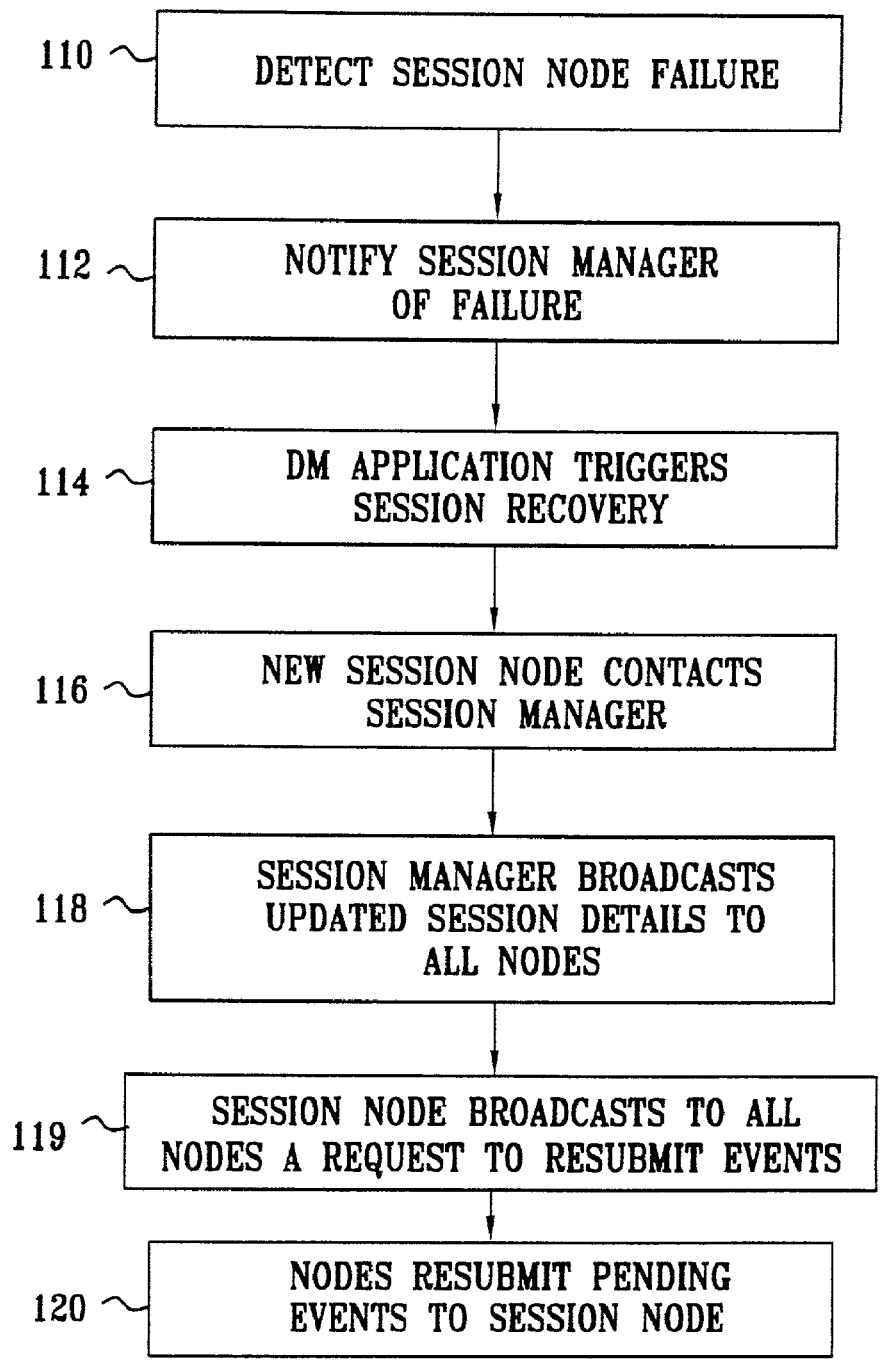
FIG. 6 is a flow chart that schematically illustrates a method for handling a DMAPI session failure in a parallel file system, in accordance with a preferred embodiment of the present invention.

FIG. 6 is a flow chart that schematically illustrates a method for dealing with session failure on node 40, in accordance with a preferred embodiment of the present invention. This type of failure scenario is not addressed by the XDSM standard. The present method is needed to ensure that events generated at any of the nodes in cluster 20 can be handled in the proper manner, so that user threads that generated those events can accordingly be unblocked.

Session failure is detected at a session failure step 110, preferably by a "heartbeat" or group service that checks connectivity in cluster 20, as is known in the art. Session manager (SM) 34 plays an important role during session recovery. When session node 40 fails, SM 34 is notified, at a notification step 112. The SM marks the session as failed, but keeps all of the session details.

Recovery following the session failure is triggered by DM application 32, at a triggering step 114. There are two ways of triggering session recovery, depending on whether the DM application itself has also failed, or only the PFS has failed:

Explicit recovery—If the DM application failed at the same time as the session (due to node crash, for example), it must be restarted, possibly on another node. The restarted DM application explicitly assumes the old session, using the DMAPI function dm_create_session( ) and specifying the session ID. Assumption of the failed session triggers reconstruction of the session queue and the events on it on the new session node, as described below. The DM application can then continue handling events. If the DM application survives, it may notice that the session has failed, on account of the error codes that it receives in response to DMAPI function calls. In this case, the application may wait for the PFS to recover on the failed node, or it may alternatively move to another node and assume the failed session, as described above.

Implicit recovery—Since the DM application executes as a separate process, independent of the PFS, it is possible that the PFS will recover before the DM application has even noticed the failure. In this case, session queue reconstruction is triggered implicitly when the DM application invokes any DMAPI function for the session at the session node. Explicit session assumption is unnecessary in this situation.

Calling dm_create_session( ) and supplying the session ID (explicit recovery) or calling any DMAPI function for the session (implicit recovery) causes DMAPI 26 on the new session node to contact SM 34, at a contact step 116. The SM records the new session node and session information string, if any, and changes the session state from failed to valid. It broadcasts the updated session details to all nodes, at a broadcast step 118.

While recovering the session, it is necessary to reconstruct the session queue at the new session node. Preferably, in order to reconstruct the session queue, session node 40 broadcasts a request to all of the nodes in cluster 20, at a request step 119. Upon receiving this request, the surviving nodes resubmit any pending synchronous events they may have to the new session node, at a resubmission step 120. This step causes the event tokens to be regenerated with the same IDs as they had before the failure. Certain events may not be recoverable by DMAPI 26 following a session failure. Asynchronous events are lost with no harm done. Events that originated from the failed session node, including user events, cannot be recovered by the resubmission mechanism described above.

Session failure results in the loss of resources associated with the events in the session queue, including DM access rights. These resources are not recovered simply by resubmitting the events. As a result, DMAPI functions may fail after session recovery due to invalid DM access rights. Furthermore, DMAPI 26 cannot determine after recovery which events were already being handled by the DM application prior to the failure, nor can it guarantee that none of the files in question were accessed or modified before the failure. All events resubmitted after a failure revert to the initial (non-outstanding) state. Similarly, when only a file system instance fails at the session node, all DM access rights for files in the file system are lost, although the events and tokens remain. After the file system instance is remounted, the DM application must reacquire the access rights. There is no guarantee that objects have not been modified while the access rights were not held. Therefore, DM application 32 should be written so as to recover consistently from the loss of DM access rights, notwithstanding the associated loss of information. For example, the DM application could be programmed to keep its own state of events in progress or to implement an appropriate consistency protocol, as is known in the art.

It is desirable to provide mechanisms that will speed up recovery from a session failure and will prevent indefinite blocking of user applications. Preferably, if a failed session does not recover after a predetermined lapse of time, pending events are aborted at source node 42, and file operations associated with the events are failed. User applications 30 can then retry the failed operations as appropriate.

It may also occur that SM 34 fails, in which case a new SM is appointed. The new SM must recover all of the information that was maintained by the previous SM. For this purpose, the new SM preferably broadcasts a request to all nodes for session information. Each node responds by sending the SM a list of all the sessions existing on that node and the event dispositions for all the file systems that are mounted at the node. The new SM uses this information to rebuild the collective session and disposition information.

The only information that may not be fully recovered in this manner is concerning sessions that existed on the failed SM node. As indicated above, each node preferably keeps partial information on every session. Most of the missing information can therefore be retrieved locally at the new SM node, from the list of all sessions that was maintained at that node. The only unrecoverable information regarding sessions that existed on the failed SM node is the session information string. As noted above, typically only a prefix of this string is maintained on nodes other than the session node itself.

The new SM reconstructs event dispositions based on information that it receives from the file system managers (FSMs) 36 in cluster 20. If a FSM has failed, the corresponding information is recovered from one of the other nodes that mounted the file system in question. If all of the nodes that mounted the file system have failed, however, the dispositions are lost, and new dispositions for the file system will have to be set when the file system is mounted on some node.

After reconstructing the dispositions, the new SM must make sure that the information it now has is consistent with all of the nodes. For this purpose, the SM sends its reconstructed dispositions to the FSMs, which in turn send it to all the nodes that have mounted corresponding file system instances. If some file system has no FSM (typically due to FSM failure), the dispositions are held at the SM and are sent to the new FSM when one is appointed.

Although preferred embodiments are described hereinabove with reference to a particular configuration of cluster 20 and parallel file system 28, it will be appreciated that the principles embodied in DMAPI 26 are similarly applicable in other parallel file system environments, as well. It will thus be understood that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. In a cluster of computing nodes having shared access to one or more file systems in data storage using parallel file system software, a method for managing the data storage, comprising:

initiating a session of a data management application on a first one of the nodes;

receiving a request submitted to the parallel file system software at a second one of the nodes to mount one of the file systems in the data storage on the second one of the nodes;

sending a mount event message from the second node to the first node responsive to the request, for processing by the data management application on the first node;

mounting first and second instances of the one of the file systems on the first and second nodes, respectively, responsive to the mount event message;

receiving a further request at the second node to unmount the second instance of the one of the file systems at the second node;

sending, responsive to the further request, a preunmount event message to the first node; and responding to the preunmount event message so as to permit unmounting of the second file system instance without unmounting the first file system instance.

2. A method according to claim 1, wherein responding to the preunmount event message comprises determining at the first node, responsive to one or more flags set in the preunmount event message, whether the request was submitted on the first node or on another one of the nodes.

3. A method according to claim 1, and comprising:
receiving the preunmount event message at the first node;
obtaining a data management access right from a physical file system (PFS) software component at the first node responsive to the preunmount event message; and
processing the preunmount event message using the access right.

4. A method according to claim 1, wherein receiving the request comprises receiving first and second requests to mount different ones of the file systems in the data storage, and wherein receiving the further request comprises receiving further first and second requests to unmount the different ones of the file systems, and wherein sending the preunmount event message comprises, responsive to dispositions set for the different ones of the file systems, sending a first preunmount event message to the first node responsive to the first unmount request, and sending a second preunmount event message responsive to the second unmount request to a further node, on which a further data management application session has been initiated.

5. A method according to claim 1, wherein responding to the preunmount event message comprises sending a reply to the message from the first node to the second node, and comprising, responsive to the reply, unmounting the second file system instance and sending an unmount event message from the second node to the first node.

6. A method according to claim 5, and comprising determining at the first node, responsive to one or more flags set in the unmount event message, whether the further request was submitted on the first node or on another one of the nodes.

7. A method according to claim 1, and comprising determining at the first node, responsive to one or more flags set in the mount event message, whether the request was submitted on the first node or on another one of the nodes.

8. A method according to claim 1, wherein initiating the session comprises initiating the session in accordance with a data management application programming interface (DMAPI) of the parallel file system software, and wherein receiving the request and sending the mount event message comprise processing the request and sending the message using the DMAPI.

9. A method according to claim 8, and comprising receiving an unmount request to unmount the file system from the second node using the DMAPI, and sending a preunmount event message to the first node responsive to the unmount request using the DMAPI, for processing by the data management application on the first node.

10. A method according to claim 9, and comprising sending a reply to the preunmount event message from the first node to the second node using the DMAPI, and, responsive to the reply, unmounting the file system at the second node, and sending an unmount event message to the first node using the DMAPI.

11. A method according to claim 8, and comprising receiving and processing the event message at the first node using one or more functions of the DMAPI called by the data management application.

12. A method according to claim 8, wherein sending the event message comprises sending the message for processing in accordance with a disposition specified by the data management application using the DMAPI for association with an event generated by the file operation.

13. A method according to claim 8, wherein sending the event message comprises setting one or more flags in the message to indicate whether the request was submitted on the first node or on another one of the nodes.

14. A method according to claim 8, and comprising invoking a function of the DMAPI to obtain mount information regarding the one of the file systems, and wherein in a response provided by the function, one or more flags are set to indicate whether the one of the file systems is mounted on the first node or on another one of the nodes in the cluster or on both the first node and on another one of the nodes in the cluster.

15. A method according to claim 1, and comprising:
receiving a response to the mount event message from the data management application on the first node; and
mounting an instance of the one of the file systems on the second node subject to the response from the data management application on the first node.

16. A method according to claim 1, and comprising receiving a further request submitted to the parallel file system software to mount the one of the file systems on a further one of the nodes, and sending a further mount event message responsive to the further request for processing by the data management application on the first node.

17. A method according to claim 16, wherein the further one of the nodes is the first node.

18. A method according to claim 17, and comprising receiving first and second unmount requests to unmount the file system from the second node and from the further one of the nodes, and generating first and second preunmount event messages at the second node and at the further one of the nodes responsive to the first and second unmount requests, for processing by the data management application on the first node.

19. A method according to claim 18, and comprising sending a reply to the first and second preunmount event messages from the first node to the second node and to the further one of the nodes, and, responsive to the reply, unmounting the file system at the second node and the further one of the nodes, and generating respective unmount event messages at the second node and at the further one of the nodes.

20. A method according to claim 1, wherein initiating the session of the data management application comprises initiating a data migration application, so as to free storage space on at least one of the volumes of data storage.

21. A method according to claim 1, wherein the request to mount one of the file systems is submitted by a user application running on the second one of the nodes.

22. Computing apparatus, comprising:
one or more volumes of data storage, arranged to store data in one or more file systems; and
a plurality of computing nodes, linked to access the volumes of data storage using parallel file system software, and arranged so as to enable a data management application to initiate a data management session on a first one of the nodes, so that when a request is submitted to the parallel file system software at a second one of the nodes to mount one of the file systems in the data storage on the second one of the nodes, a mount event message is sent from the second node to the first node responsive to the request, for processing by the data management application on the first node, wherein the nodes are arranged so that first and second instances of the one of the file systems are mounted on the first and second nodes, respectively, responsive to the mount event message, and wherein responsive to a further request at the second node to unmount the second instance of the one of the file systems at the second node, a preunmount event message is sent to the first node, which is arranged to respond to the preunmount event message so as to permit unmounting of the second file system instance without unmounting the first file system instance.

23. Apparatus according to claim 22, wherein the first node is arranged to respond to the unmount event message by determining, responsive to one or more flags set in the preunmount event message, whether the request was submitted on the first node or on another one of the nodes.

24. Apparatus according to claim 22, wherein the first node is arranged, upon receiving the preunmount event message, to obtain a data management access right from a physical file system (PFS) software component at the first node responsive to the preunmount event message, and to process the preunmount event message using the access right.

25. Apparatus according to claim 22, wherein the request comprises first and second requests to mount different ones of the file systems in the data storage, and wherein the further request comprises further first and second requests to unmount the different ones of the file systems, and wherein the nodes are arranged, responsive to dispositions set for the different ones of the file systems, to send a first preunmount event message to the first node responsive to the first unmount request, and to send a second preunmount event message responsive to the second unmount request to a further node, on which a further data management application session has been initiated.

26. Apparatus according to claim 22, wherein the first node is arranged to send a reply to the message to the second node, and responsive to the reply, the second node is arranged to unmount the second file system instance and to send an unmount event message to the first node.

27. Apparatus according to claim 26, wherein the first node is arranged to determine, responsive to one or more flags set in the unmount event message, whether the further request was submitted on the first node or on another one of the nodes.

28. Apparatus according to claim 22, wherein the first node is arranged to determine, responsive to one or more flags set in the mount event message, whether the request was submitted on the first node or on another one of the nodes.

29. Apparatus according to claim 22, wherein the session is initiated in accordance with a data management application programming interface (DMAPI) of the parallel file system software, and wherein the request is processed and the mount event message is sent using the DMAPI.

30. Apparatus according to claim 29, wherein when an unmount request is received to unmount the file system from the second node using the DMAPI, a preunmount event message is sent to the first node responsive to the unmount request using the DMAPI, for processing by the data management application on the first node.

31. Apparatus according to claim 30, wherein the first node is arranged to send a reply to the preunmount event message to the second node using the DMAPI, wherein responsive to the reply, the file system is unmounted at the second node, and an unmount event message is sent to the first node using the DMAPI.

32. Apparatus according to claim 29, wherein the event message is received and processed at the first node using one or more functions of the DMAPI called by the data management application.

33. Apparatus according to claim 29, wherein the mount event message is sent for processing in accordance with a disposition specified by the data management application using the DMAPI for association with the mount event.

34. Apparatus according to claim 29, wherein one or more flags are set in the event message to indicate whether the request was submitted on the first node or on another one of the nodes.

35. Apparatus according to claim 29, wherein the first node is arranged to invoke a function of the DMAPI to obtain mount information regarding the one of the file systems, and wherein in a response provided by the function, one or more flags are set to indicate whether the one of the file systems is mounted on the first node or on another one of the nodes in the cluster or on both the first node and on another one of the nodes in the cluster.

36. Apparatus according to claim 22, wherein after the mount event message is received at the first node, an instance of the one of the file systems is mounted on the second node subject to the response from the data management application on the first node.

37. Apparatus according to claim 22, wherein responsive to a further request submitted to the parallel file system software to mount the one of the file systems on a further one of the nodes, a further mount event message responsive to the further request is sent for processing by the data management application on the first node.

38. Apparatus according to claim 37, wherein the further one of the nodes is the first node.

39. Apparatus according to claim 38, wherein upon receiving first and second unmount requests to unmount the file system from the second node and from the further one of the nodes, first and second preunmount event messages are generated at the second node and at the further one of the nodes responsive to the first and second unmount requests, for processing by the data management application on the first node.

40. Apparatus according to claim 39, wherein the first node is arranged to send a reply to the first and second preunmount event messages to the second node and to the further one of the nodes, and wherein, responsive to the reply, the file system is unmounted at the second node and the further one of the nodes, and respective unmount event messages are generated at the second node and at the further one of the nodes.

41. Apparatus according to claim 22, wherein the data management application comprises a data migration application, for freeing storage space on at least one of the volumes of data storage.

42. Apparatus according to claim 22, wherein the request to mount one of the file systems is submitted by a user application running on the second one of the nodes.

43. A computer software product for use in a cluster of computing nodes having shared access to one or file systems in data storage, accessed using parallel file system software, the product comprising a computer-readable medium in which program instructions are stored, which instructions, when read by the computing nodes, cause a session of a data management application to be initiated on a first one of the nodes, and in response to a request submitted to the parallel file system software at a second one of the nodes to mount one of the file systems in the data storage on the second node, cause the second node to send a mount event message to the first node, for processing by the data management application on the first node, wherein the instructions cause the nodes to mount first and second instances of the one of the file systems on the first and second nodes, respectively, responsive to the mount event message, and wherein responsive to a further request at the second node to unmount the second instance of the one of the file systems at the second node, the instructions cause a preunmount event message to be sent to the first node, and cause the first node to respond to the preunmount event message so as to permit unmounting of the second file system instance without unmounting the first file system instance.

44. Apparatus according to claim 43, wherein the instructions cause the first node to respond to the preunmount event message by determining, responsive to one or more flags set in the preunmount event message, whether the request was submitted on the first node or on another one of the nodes.

45. Apparatus according to claim 43, wherein the instructions cause the first node, upon receiving the preunmount event message, to obtain a data management access right from a physical file system (PFS) software component at the first node responsive to the preunmount event message, and to process the preunmount event message using the access right.

46. Apparatus according to claim 43, wherein the request comprises first and second requests to mount different ones of the file systems in the data storage, and wherein the further request comprises further first and second requests to unmount the different ones of the file systems, and wherein the instructions cause the nodes, responsive to dispositions set for the different ones of the file systems, to send a first preunmount event message to the first node responsive to the first unmount request, and to send a second preunmount event message responsive to the second unmount request to a further node, on which a further data management application session has been initiated.

47. Apparatus according to claim 43, wherein the instructions cause the first node to send a reply to the message to the second node, and cause the second node, responsive to the reply, to unmount the second file system instance and to send an unmount event message to the first node.

48. A product according to claim 47, wherein the instructions cause the first node to determine, responsive to one or more flags set in the unmount event message, whether the further request was submitted on the first node or on another one of the nodes.

49. A product according to claim 43, wherein the instructions cause the first node to determine, responsive to one or more flags set in the mount event message, whether the request was submitted on the first node or on another one of the nodes.

50. A product according to claim 43, wherein the product comprises a data management application programming interface (DMAPI) of the parallel file system software, and wherein the request is processed and the mount event message is sent using the DMAPI.

51. A product according to claim 50, wherein when an unmount request is received to unmount the file system from the second node using the DMAPI, the instructions cause a preunmount event message to be sent to the first node responsive to the unmount request using the DMAPI, for processing by the data management application on the first node.

52. A product according to claim 51, wherein the instructions cause the first node to send a reply to the preunmount event message to the second node using the DMAPI, wherein responsive to the reply, the file system is unmounted at the second node, and an unmount event message is sent to the first node using the DMAPI.

53. A product according to claim 50, wherein the event message is received and processed at the first node using one or more functions of the DMAPI called by the data management application.

54. A product according to claim 50, wherein the event message is sent for processing in accordance with a disposition specified by the data management application using the DMAPI for association with an event generated by the file system.

55. A product according to claim 50, wherein one or more flags are set in the event message to indicate whether the request was submitted on the first node or on another one of the nodes.

56. A product according to claim 50, wherein the instructions cause the first node to invoke a function of the DMAPI to obtain mount information regarding the one of the file systems, and wherein in a response provided by the function, one or more flags are set to indicate whether the one of the file systems is mounted on the first node or on another one of the nodes in the cluster or on both the first node and on another one of the nodes in the cluster.

57. A product according to claim 43, wherein after the mount event message is received at the first node, an instance of the one of the file systems is mounted on the second node subject to the response from the data management application on the first node.

58. A product according to claim 43, wherein responsive to a further request submitted to the parallel file system software to mount the one of the file systems on a further one of the nodes, a further mount event message responsive to the further request is sent for processing by the data management application on the first node.

59. A product according to claim 58, wherein the further one of the nodes is the first node.

60. A product according to claim 59, wherein upon receiving first and second unmount requests to unmount the file system from the second node and from the further one of the nodes, the instructions cause first and second preunmount event messages to be generated at the second node and at the further one of the nodes responsive to the first and second unmount requests, for processing by the data management application on the first node.

61. A product according to claim 60, wherein the instructions cause the first node to send a reply to the first and second preunmount event messages to the second node and to the further one of the nodes, and wherein, responsive to the reply, the file system is unmounted at the second node and the further one of the nodes, and respective unmount event messages are generated at the second node and at the further one of the nodes.

62. A product according to claim 43, wherein the data management application comprises a data migration application, for freeing storage space on at least one of the volumes of data storage.

63. A product according to claim 43, wherein the request to mount one of the file systems is submitted by a user application running on the second one of the nodes.

* * * * *